(12) United States Patent
Socarras et al.

(10) Patent No.: US 12,498,781 B2
(45) Date of Patent: Dec. 16, 2025

(54) ADAPTIVE VOLTAGE MARGIN TECHNIQUES

(71) Applicant: Apple Inc., Cupertino, CA (US)

(72) Inventors: Angel E. Socarras, Orlando, FL (US); Vivek Oppula, Austin, TX (US); Benoit M. Jubelin, Austin, TX (US); Gus P. Ikonomopoulos, Lakeway, TX (US); Jason P. Jane, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 18/394,997

(22) Filed: Dec. 22, 2023

(65) Prior Publication Data

US 2025/0208694 A1 Jun. 26, 2025

(51) Int. Cl.
| | |
|---|---|
| *G06F 1/3296* | (2019.01) |
| *G06F 1/3228* | (2019.01) |
| *G06F 1/3234* | (2019.01) |
| *G06F 1/324* | (2019.01) |

(52) U.S. Cl.
CPC .......... *G06F 1/3296* (2013.01); *G06F 1/3228* (2013.01); *G06F 1/324* (2013.01); *G06F 1/3275* (2013.01)

(58) Field of Classification Search
CPC ...... G06F 1/3296; G06F 1/3228; G06F 1/324; G06F 1/3275
See application file for complete search history.

(56) References Cited

U.S. PATENT DOCUMENTS

| | | | | |
|---|---|---|---|---|
| 6,763,471 B1 * | 7/2004 | Aoyama | ............... | G06F 1/3203 |
| | | | | 713/320 |
| 7,155,621 B2 * | 12/2006 | Dai | ...................... | G06F 1/3296 |
| | | | | 713/323 |
| 7,506,189 B1 * | 3/2009 | Lee | ......................... | G06F 1/324 |
| | | | | 713/340 |

(Continued)

FOREIGN PATENT DOCUMENTS

| | | |
|---|---|---|
| JP | 2000-076221 A1 | 3/2000 |
| KR | 10-2010-0126166 A | 12/2010 |
| WO | WO-2011104241 A1 * 9/2021 | ........... G06F 1/3203 |

OTHER PUBLICATIONS

International Search Report and Written Opinion in PCT Appl. No. PCT/US2024/060710 mailed Apr. 14, 2025, 8 pages.

*Primary Examiner* — Faisal M Zaman
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to power control and voltage margining. In some embodiments, first and second component circuits operate based on a supply voltage generated by a power supply. Voltage sensor circuitry may generate voltage measurements. Voltage margin control circuitry may determine a voltage ceiling based on a current operating state of the first component circuit and a current operating state of the second component circuit. The control circuitry may transmit control signals to the power supply to incrementally reduce the supply voltage until detecting a low-supply-voltage condition based on a voltage measurement generated by the voltage sensor circuitry. Disclosed techniques may advantageously provide voltage margin while reducing overall power consumption.

20 Claims, 10 Drawing Sheets

(56) References Cited

U.S. PATENT DOCUMENTS

| | | | |
|---|---|---|---|
| 8,074,093 B1* | 12/2011 | Johnson | G06F 1/3296 |
| | | | 713/502 |
| 9,122,291 B2 | 9/2015 | Moore et al. | |
| 9,269,407 B1* | 2/2016 | Bickford | G11C 5/147 |
| 9,354,690 B1* | 5/2016 | Joffe | G06F 1/324 |
| 9,606,605 B2 | 3/2017 | Mylius et al. | |
| 10,401,938 B1* | 9/2019 | Lee | G06F 1/3296 |
| 11,209,886 B2* | 12/2021 | Hovis | G06F 1/324 |
| 11,360,504 B2 | 6/2022 | Kosonocky | |
| 2004/0239395 A1* | 12/2004 | Nakai | G06F 1/3296 |
| | | | 327/277 |
| 2005/0107967 A1* | 5/2005 | Patel | G01R 31/31718 |
| | | | 702/64 |
| 2006/0143484 A1* | 6/2006 | Samson | G06F 1/3237 |
| | | | 713/320 |
| 2011/0089760 A1 | 4/2011 | Castelaz et al. | |
| 2012/0023382 A1* | 1/2012 | Sandhu | G06F 1/324 |
| | | | 714/E11.159 |
| 2013/0159746 A1* | 6/2013 | Kobayashi | G06F 1/3287 |
| | | | 713/320 |
| 2013/0311792 A1* | 11/2013 | Ponnathota | G06F 1/26 |
| | | | 713/300 |
| 2014/0070879 A1* | 3/2014 | Kawasaki | G06F 1/263 |
| | | | 327/543 |
| 2014/0344596 A1* | 11/2014 | Keppel | G06F 1/324 |
| | | | 713/322 |
| 2015/0253836 A1* | 9/2015 | Mylius | G06F 1/3206 |
| | | | 713/320 |
| 2016/0072457 A1* | 3/2016 | Subrahmaniyan Radhakrishnan | H03F 1/0227 |
| | | | 375/219 |
| 2016/0291625 A1* | 10/2016 | Tripathi | G06F 1/3296 |
| 2017/0068309 A1* | 3/2017 | Toosizadeh | G06F 1/3296 |
| 2019/0196740 A1* | 6/2019 | Notani | G11C 29/022 |
| 2019/0384370 A1* | 12/2019 | Kim | G06N 3/065 |
| 2019/0384603 A1* | 12/2019 | Kim | G06F 1/3243 |
| 2020/0272220 A1* | 8/2020 | Mosalikanti | G01R 19/2513 |
| 2021/0089364 A1 | 3/2021 | Blankenburg et al. | |
| 2022/0035432 A1 | 2/2022 | Choi et al. | |
| 2022/0091656 A1 | 3/2022 | Nge et al. | |
| 2022/0300064 A1* | 9/2022 | Chen | G06F 1/3243 |
| 2023/0031415 A1* | 2/2023 | Rajwan | G06F 11/3058 |
| 2023/0071427 A1* | 3/2023 | Fluhr | G06F 1/3206 |
| 2023/0079229 A1* | 3/2023 | Lovell | G06N 3/065 |
| | | | 706/15 |
| 2023/0113953 A1* | 4/2023 | Pappu | G06F 1/325 |
| 2023/0318286 A1 | 10/2023 | Collura et al. | |

\* cited by examiner

ADAPTIVE VOLTAGE MARGIN TECHNIQUES

BACKGROUND

Technical Field

This disclosure relates generally to powering computing devices and more particularly to techniques for controlling voltage margin.

Description of Related Art

Power management circuitry may control the performance state of processor circuitry to provide voltage margin, which may protect against voltage droops and other events. Such events may introduce processing errors, damage components, or both. Different performance states (e.g., P-states) may have different clock frequencies and supply voltages.

Various devices may have heterogeneous components that share certain supply voltage rails. For example, a system-on-a-chip may include a fabric and different processors that have substantially different power characteristics in different operating states. As another example, a graphics processor may include certain components that are similar (e.g., shader cores) and other components that are more specialized (e.g., matrix multiply accelerators, ray tracing accelerators, etc.). Providing voltage margin while maintaining low overall power consumption across operating scenarios may be challenging in such devices.

DETAILED DESCRIPTION

In disclosed embodiments, adaptive voltage control circuitry is configured to provide fine-grained control of a supply voltage ceiling (e.g., based on the current operating state of various components) while incrementally lowering supply voltage when possible. The adaptive controller may use voltage sensors to detect when actual measured voltage (e.g., a junction voltage) drops below a threshold to back off supply voltage reductions. Therefore, speaking generally, the adaptive controller may target its operations within an envelope between a voltage ceiling dictated by what components are active and a voltage floor provided by sensors. Various voltage adjustments may be performed synchronously, asynchronously, or both based on various triggers.

Further, in some embodiments, the adaptive controller may wait to add margin for a component until certain events occur after the component becomes active. For example, for graphics accelerator circuitry, the adaptive controller may not add margin immediately when the accelerator is powered up. Instead, the adaptive controller may wait until the first accelerated instruction is encountered in a shader pipeline before adding to the voltage ceiling for the accelerator circuitry. In these embodiments, control circuitry may further limit activity by the component until the margin is fully added.

Still further, in some embodiments, the device may implement multiple supply voltage thresholds and implement an escalated recovery procedure if a lower threshold measured voltage is detected (e.g., below the threshold that triggers an increase in supply voltage). For example, the device may rapidly downshift clock frequency in response to detecting the lower threshold.

Various disclosed techniques may advantageously reduce overall power consumption while providing sufficient margining for various types of workloads.

Graphics Processing Overview

Figure 1A:
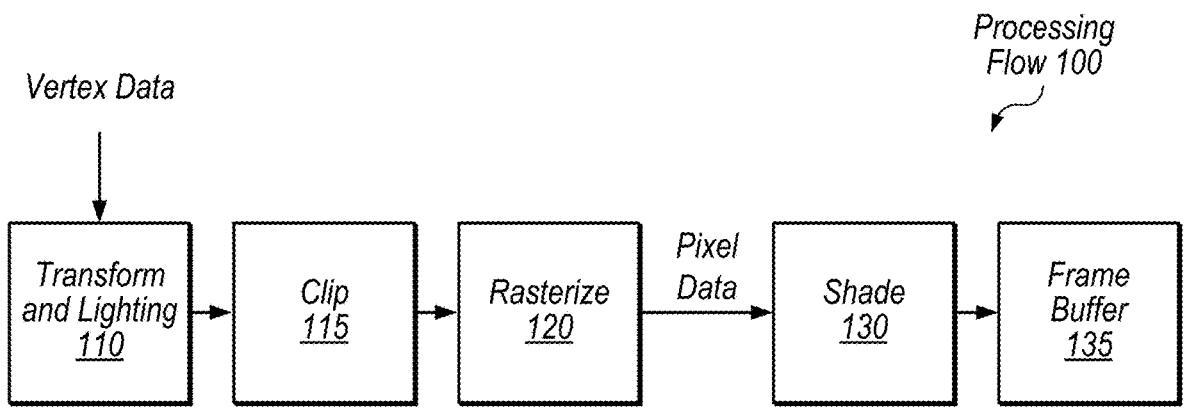
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
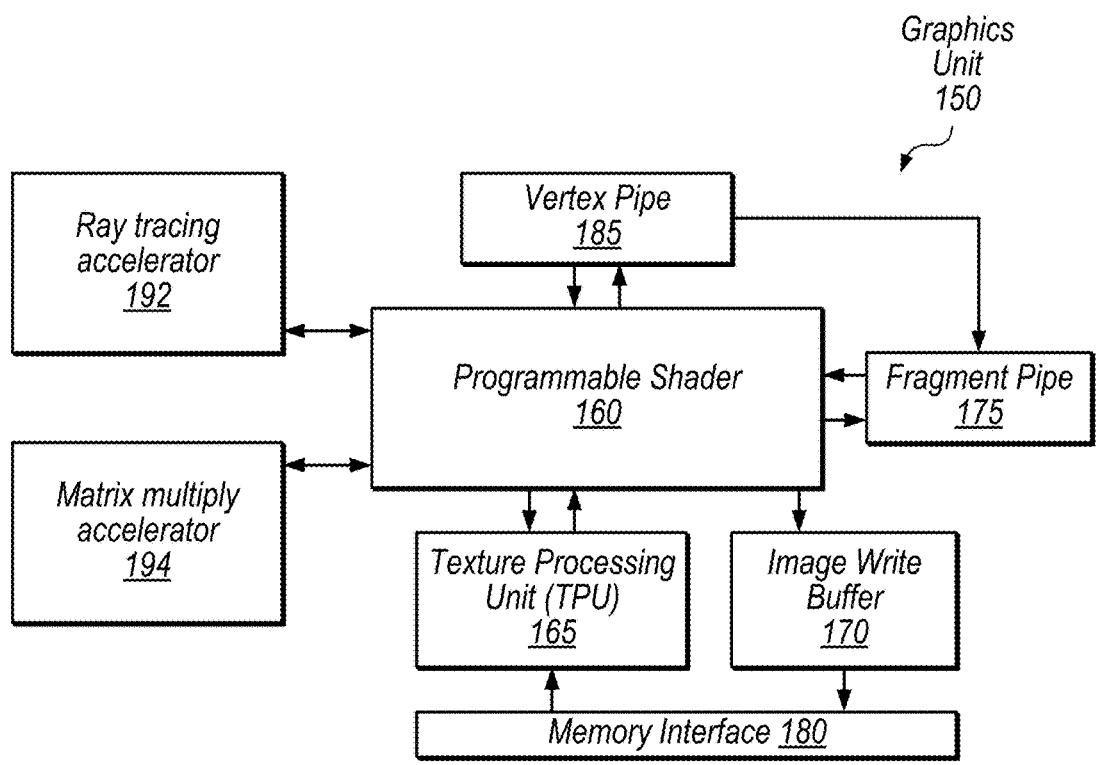
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersect accelerator (RIA) 192, which may include hardware configured to perform various ray intersect operations (e.g., for traversal of a bounding volume hierarchy acceleration data structure) in response to instruction(s) executed by programmable shader 160, as described in detail below.

In the illustrated example, graphics unit 150 includes matrix multiply accelerator 194, which may include hardware configured to perform various matrix multiply operations in response to instruction(s) executed by programmable shader 160, as described in detail below.

Overview of Adaptive Voltage Control

Figure 2:
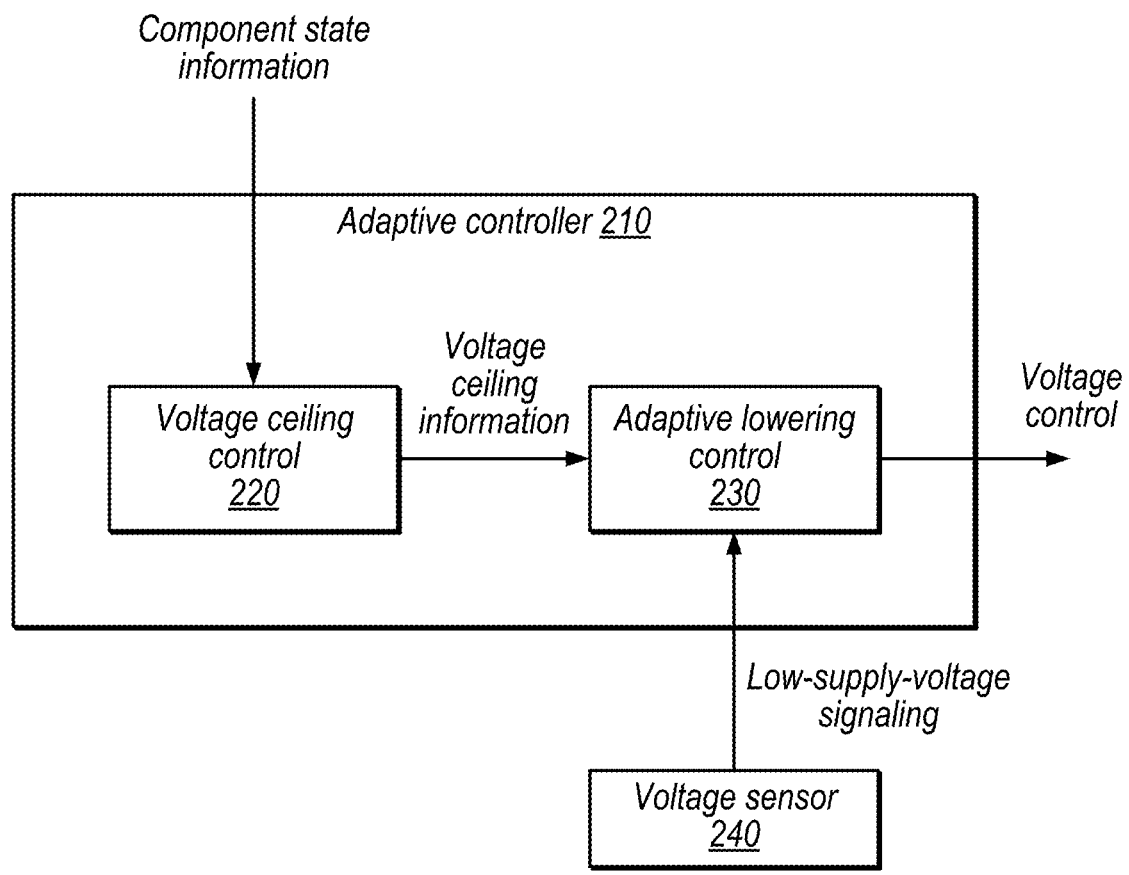
FIG. 2 is a block diagram illustrating example adaptive controller circuitry with ceiling control and adaptive lowering, according to some embodiments.

FIG. 2 is a block diagram illustrating example adaptive controller circuitry with ceiling control and adaptive lowering, according to some embodiments. In the illustrated example, adaptive controller 210 includes voltage ceiling control circuitry 220 and adaptive lowering control circuitry 230 and is configured to receive signals from voltage sensor 240. In some embodiments, adaptive controller circuitry 210 is included in graphics unit 150. In other embodiments, adaptive controller circuitry 210 is included in another type of processor (e.g., a CPU or firmware processor), in a system-on-a-chip, or any of various other appropriate circuits.

Voltage ceiling control 220, in some embodiments, is configured to receive component state information. This information may indicate the state of various components whose power is controller by controller 210. For example, this information may indicate whether these components are active, current P-state information, gating information, mode information, types of work being performed (e.g., types of instructions being executed), etc.

Based on the component state information, voltage ceiling control 220 is configured to generate voltage ceiling information for adaptive lowering control 230. The ceiling may be selected to provide voltage margin, e.g., to provide a greater supply voltage than is expected to be used by all the active components. The margining may be limited, however, to reduce overall power consumption.

Voltage sensor 240, in some embodiments, is configured to monitor actual junction voltage during operation of the device and generate voltage measurements. The difference between supply voltage and a measured junction voltage may be referred to as Vdroop, which varies based on switching activity, leakage, and which components are enabled. In the illustrated embodiment, sensor 240 provides low-supply-voltage signaling to adaptive lowering control 230. This signaling may include raw voltage measurements, filtered voltage measurements, trigger signals based on a detected threshold, etc. In some embodiments, multiple voltage sensors are implemented. Various voltage sensor circuits may be implemented (e.g., resistive type, capacitor type, etc.). Further, voltage sensors may measure voltage indirectly, e.g., based on other measurements such as current.

Adaptive lowering control 230, in some embodiments, is configured to generate voltage control signals based on the voltage ceiling information and based on low-supply-voltage signaling from voltage sensor 240. The voltage control may control power supply circuitry, for example, to adjust supply voltage within a given P-state. The power supply circuitry (not shown) may implement an appropriate interface to receive voltage control signals and responsively adjust its output voltage, e.g., to provide a requested nominal supply voltage level. The voltage control signals may also control power management circuitry, as inputs to other changes such as P-state changes.

In some embodiments, control circuitry 230 is configured to initially control the supply voltage to be at or near the voltage ceiling. Control circuitry 230 may then incrementally lower the supply voltage, e.g., until triggering a warning associated with sensor 240, at which point it may attempt to maintain the supply voltage near the current level (or slightly increase the supply voltage) until another event occurs. As discussed above, this may advantageously provide voltage margin while still maintaining low power consumption overall.

Example Control States and Detailed Controller Circuitry

Figure 3:
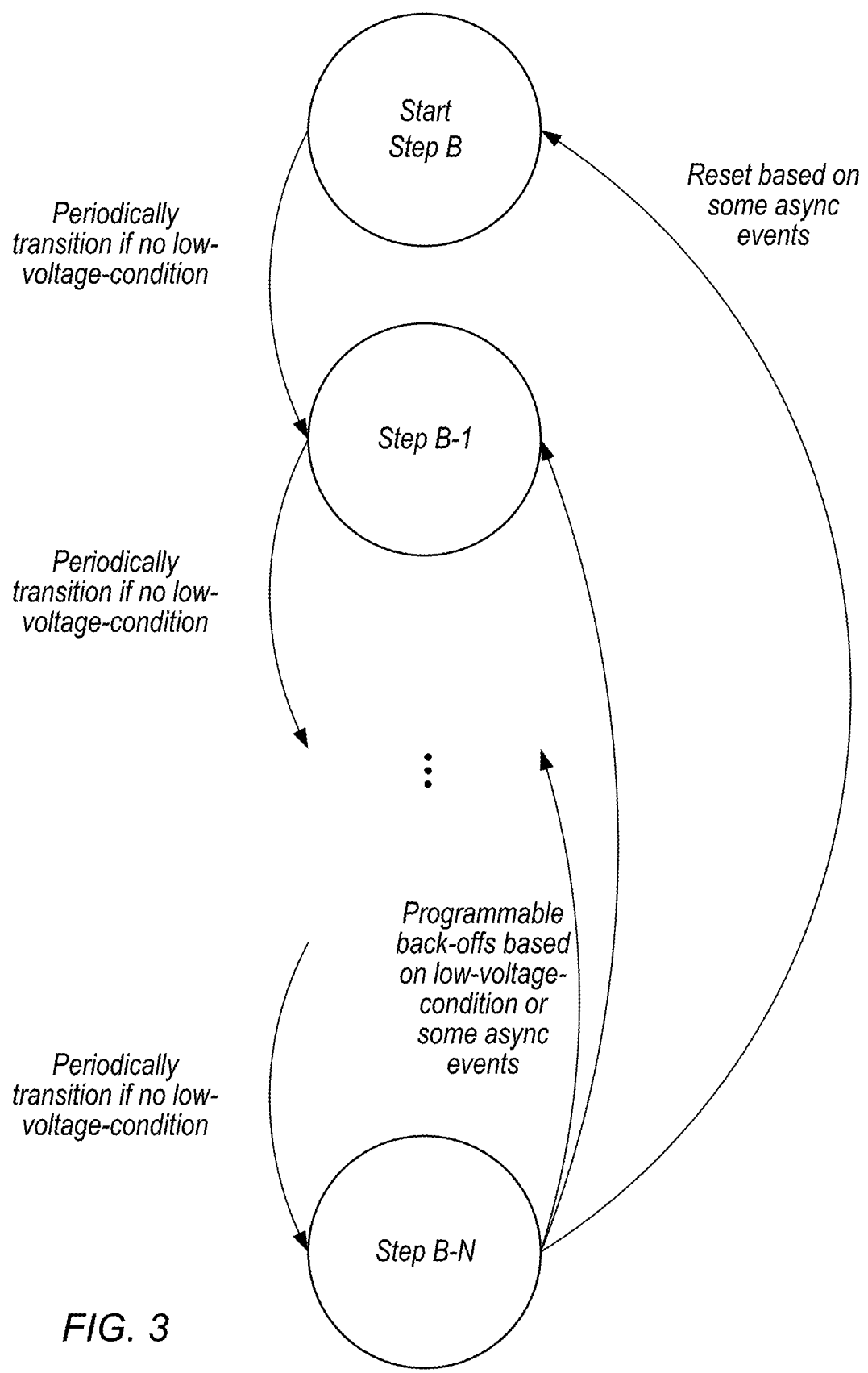
FIG. 3 is a diagram illustrating example voltage control states, according to some embodiments.

FIG. 3 is a diagram illustrating example voltage control states, according to some embodiments. In the illustrated example, adaptive controller 210 implements multiple states and transitions based on various timers, events, or both. For example, controller 210 may start at step B in response to a P-state change, which may represent the current voltage ceiling. Controller 210 may implement different set of states for each P-state (therefore, the illustrated set of states may correspond to a single P-state). In this example, states toward the top of FIG. 3 correspond to higher supply voltages than states toward the bottom of FIG. 3.

Every M clocks, controller 210 may transition to the next state (e.g., to B-1 and so on until reaching step B-N). Note that the value of M may be programmable. These transitions are shown as the periodic transitions in FIG. 3 (and may also be described as synchronous).

As shown, controller 210 may transition in the other direction in response to a low-voltage condition detected by one or more voltage sensors. The number of levels of these transitions toward upper states may be programmable. This may be synchronous (e.g., occurring at an M-clock-based transition in response to the low-voltage trigger occurring within the corresponding time period) or asynchronous (e.g., occurring immediately in response to the trigger).

Controller 210 may also transition toward upper states based on various asynchronous events. Examples of asynchronous events include, without limitation: a sensor-based trigger (e.g., a sensor indicating detection of an even lower measured voltage threshold), a P-state change, certain components becoming active (e.g., accelerator circuitry), or an idle signal (which may cause transition to a lower-voltage state). As shown, an asynchronous event may cause a programmable back-off (e.g., to add voltage margin) or a reset to the initial state. Controller 210 may send an acknowledgement signal when it has finished transitioning state based on an asynchronous event, e.g., to indicate that requested voltage margin has been added.

In some embodiments, power management circuitry (e.g., a power co-processor) may participate in determining the step sizes for controller 210 (e.g., the supply voltage levels for a given state, the number of states traversed for a given event, etc.). The power management circuitry may implement more complex algorithms than controller 210. In these embodiments, a given controller 210 may have a corresponding enable mask that indicates whether to use its internal algorithm or use step vote registers programmed by other power management circuitry. The step vote registers may control the step size, number of steps per synchronous or asynchronous event, or some combination thereof.

Figure 4:
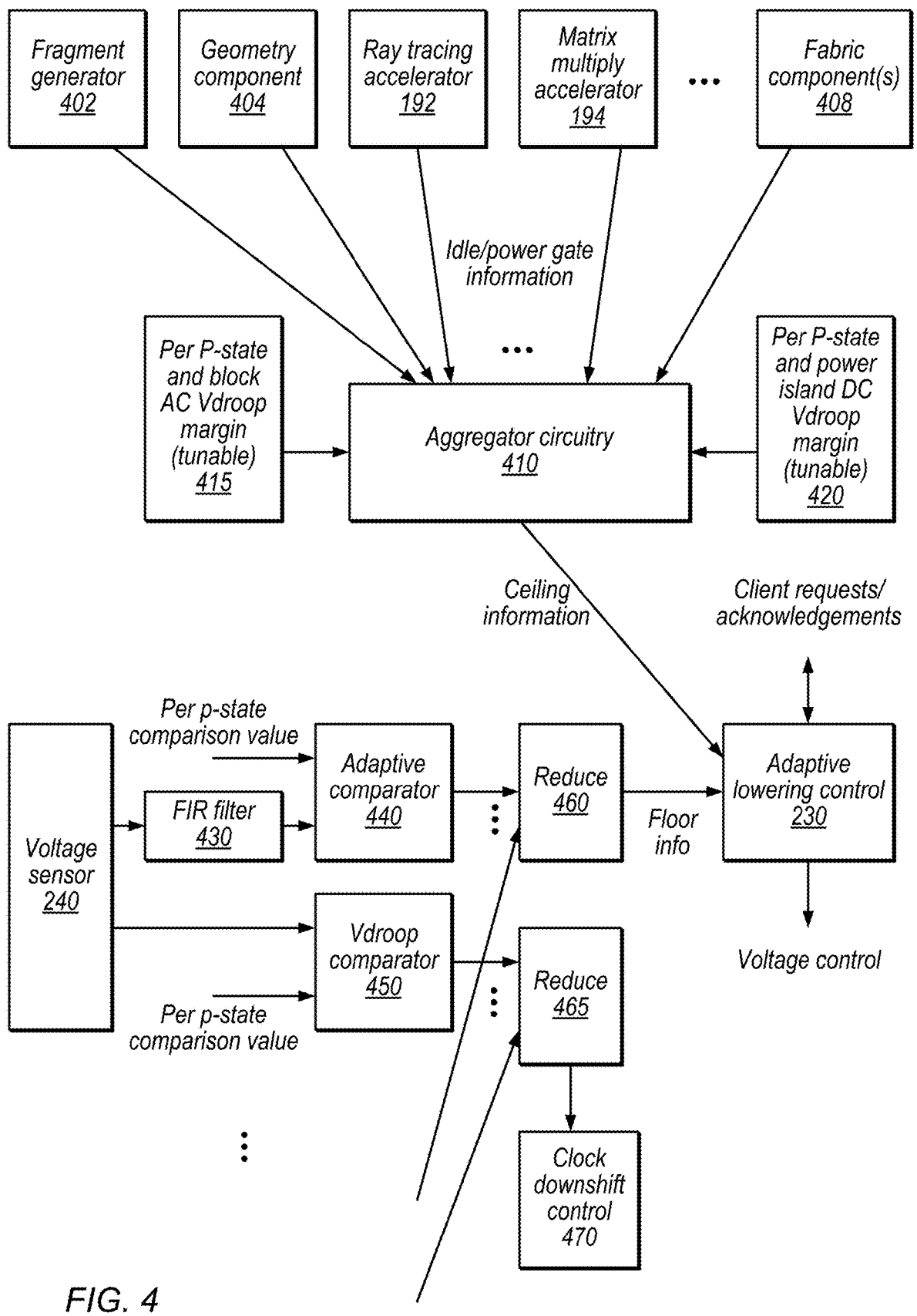
FIG. 4 is a block diagram illustrating a detailed example adaptive controller, according to some embodiments.

FIG. 4 is a block diagram illustrating a detailed example adaptive controller, according to some embodiments. In the illustrated example, multiple graphics processor client circuits provide activity information (idle/power gate information in this example) that is used to determine a voltage ceiling. Multiple voltage sensors 240 provide voltage information that is used to determine a voltage floor. The graphics processor client circuits may also be referred to as components or blocks.

In particular, the client circuits include fragment generator circuitry 402, geometry component circuitry 404, ray tracing accelerator circuitry 192, matrix multiply accelerator 194, and fabric components 408. These clients are included to facilitate explanation but are not intended to limit the scope of the present disclosure. Various clients may be added or omitted in other embodiments.

Aggregator circuitry 410, in the illustrated embodiment, is configured to receive the idle and power gate information from the client circuits, as well as tunable AC voltage droop margin information from storage circuit 415 and tunable DC voltage droop margin information from storage circuit 420. As shown, the AC voltage droop margins may be maintained per P-state and block while the AC voltage droop margins may be maintained per P-state and power island. Aggregator circuitry 410 may look up the appropriate margins based on which clients are active and determine a voltage ceiling that satisfies the margins for active clients. In some embodiments, the aggregator circuitry operates using a credit mechanism, e.g., where credits are returned when a client is power gated.

Multiple voltage sensors 240, in the illustrated embodiment, determine voltage measurements that are processed by finite impulse response (FIR) filter circuitry 430, comparator circuitry 440 and 450, and reduce circuitry 460 to provide floor information to adaptive lowering control 230. FIR filter 430 may filter noise or distortion from the voltage measurements from sensor 240. A FIR filter is an example filter type, but other filters may be used in other embodiments.

Adaptive comparator 440, in the illustrated embodiment, receives the filtered voltage measurements and a comparison value for the current P-state. Therefore, the output of comparator 440 indicates whether the voltage has met the comparison value. In particular, the comparison value may be a low-voltage threshold that, when met, triggers adaptive lowering control circuitry 230 to back off one or more states, as discussed above with reference to FIG. 3.

Reduce circuitry 460, in the illustrated example, is configured to reduce the signals from multiple comparators 440 (not shown), e.g., by ORing the signals. In implementations with multiple voltage sensors, reduce circuitry 460 may implement various logic or algorithms to determine whether the floor has been met.

Adaptive lowering control 230, in the illustrated embodiment, is configured to output voltage controls signals to power supply circuitry to dynamically adjust supply voltage within the current P-state. In this example, adaptive lowering control also communicates with one or more clients. For example, a client may request additional voltage margin in response to certain events and adaptive lowering control 230 may respond when the requested margin has been provided, as discussed below with reference to FIG. 5.

In the illustrated embodiment, there is also a separate threshold for more drastic power management techniques (clock downshift, in this example). In particular, Vdroop comparator 450 also receives the voltage sensor outputs and determines whether a per P-state comparison threshold has been met. This comparison value may be lower than the comparison value for comparator 440. Reduce circuitry 465 may reduce inputs from multiple comparators 450 (although only a single comparator is explicitly shown) and provide trigger information to clock downshift control 470. Clock downshift control 470 may provide a rapid clock frequency downshift, e.g., as discussed in U.S. patent application Ser. No. 15/419,218 titled "Detecting Power Supply Noise Events and Initiating Corrective Action" and filed Jan. 30, 2017. Note that disclosed adaptive voltage margin techniques may reduce the occurrence of clock downshifting, however, e.g., by adding voltage margin before the lower threshold is detected by comparator 450.

In some embodiments, multiple graphics processor units (which may be referred to as mGPUs) may share a voltage rail. Each unit may include its own shader core(s), fixed-function circuitry, accelerator circuitry, etc. In some embodiments, arbitration circuitry is configured to arbitrate among signals from multiple adaptive lowering control circuits 230. The arbitration circuitry may select from among the greater voltage control request from multiple mGPUs to provide adequate margin for the most at-risk mGPU. In some embodiments, separate adaptive lowering control circuitry 230 for separate circuitry powered by different voltage rails may operate independently.

Example Techniques for Limiting Components while Waiting for Voltage Margin

Figure 5:
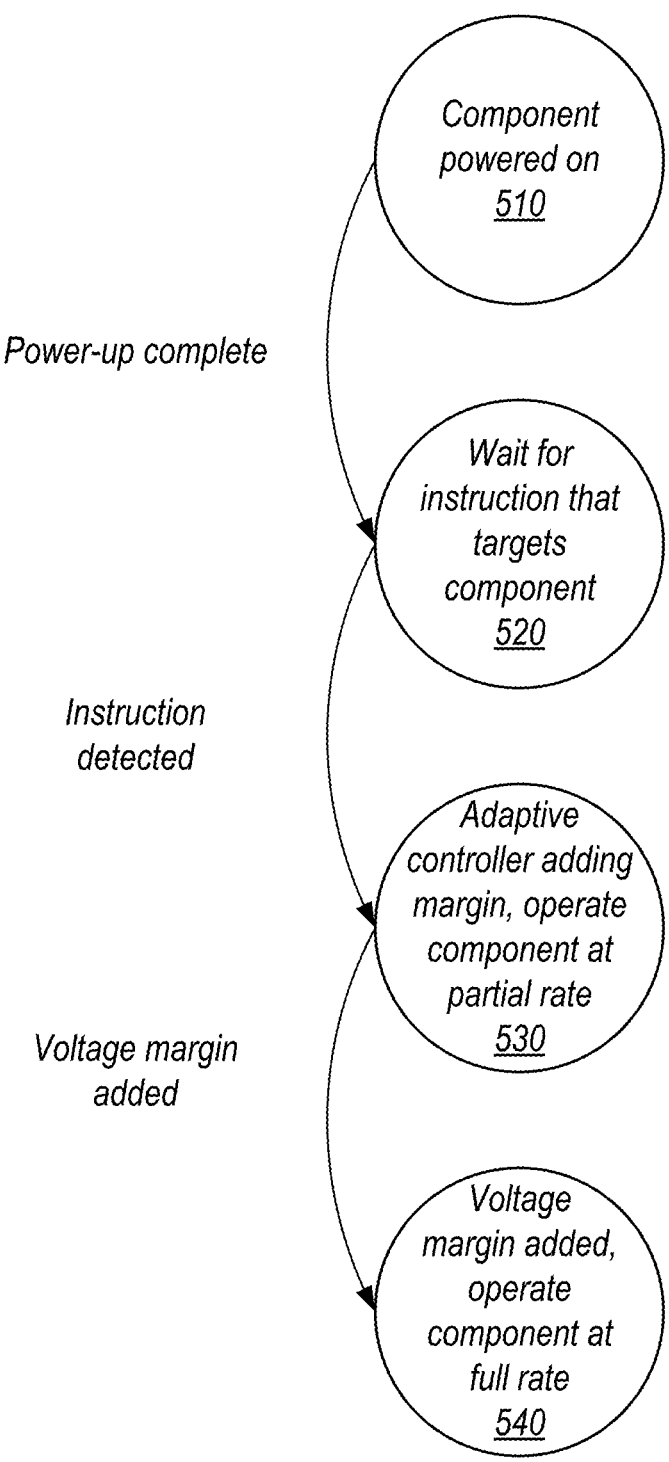
FIG. 5 is a state diagram illustrating example limiting for a component while waiting for voltage margin, according to some embodiments.

FIG. 5 is a state diagram illustrating example limiting for a component while waiting for voltage margin, according to some embodiments. In the illustrated example, a component is powered on at 510. For purposes of explanation, a matrix accelerator component will be discussed below in conjunction with FIG. 5, although disclosed techniques may be implemented for various clients.

Once power-up is complete, at 520 the processor (e.g., an instruction scheduler stage) waits for an instruction that targets the component, e.g., a matrix multiply instruction. This may avoid adding margin when it is not actually needed by the component (e.g., when the component is powered on, but has not started actually performing work).

When an instruction that targets the component is detected, at 530 the adaptive controller 210 begins a procedure to add margin (e.g., based on a request received from the component), and the processor operates the component at a partial rate. For example, the processor may insert bubbles into a pipeline of the component, use only a portion of pipelines of the component, etc. This may reduce the power consumption of the component relative to its full operating capacity, which may reduce or avoid situations where the component actually needs the voltage margin that it requested. In some embodiments, the processor may completely stall the component at 530 while waiting for its margin.

Once the voltage margin is fully added by controller 210, the processor operates the component at full rate. The techniques of FIG. 5 may advantageously avoid undesirable power scenarios by appropriately providing margin, while reducing overall power consumption by waiting to add margin until a component is actually busy.

Example Diagram of Supply Voltage Over Time and Controller Inputs

Figure 6:
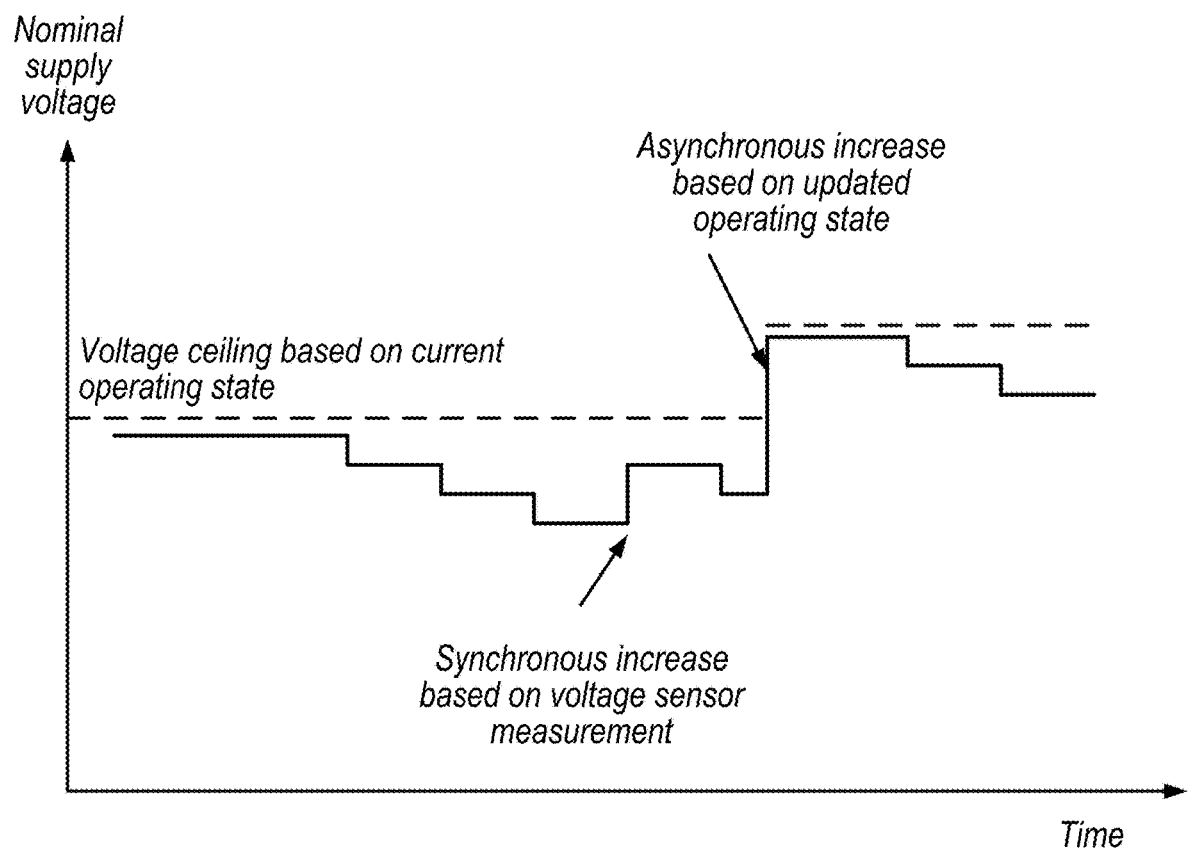
FIG. 6 is a diagram illustrating example supply voltage over time, according to some embodiments.

FIG. 6 is a diagram illustrating example supply voltage over time, according to some embodiments. In the illustrated example, the dashed lines indicate the voltage ceiling at a given point in time based on the current operating state of various components. The solid lines indicate the nominal supply voltage over time. As shown, starting from the left the supply voltage within a given P-state starts near the voltage ceiling is incrementally lowered three times, followed by a synchronous increase based on a voltage sensor junction measurement (enforcing a floor on the supply voltage). In this example, the increase is similar in magnitude to the prior two decrements, but the amount of the increase may vary. Further, the supply voltage may bounce back and forth between two or more states near the voltage floor, in some scenarios.

As discussed above, supply voltage adjustments based on junction voltage measurements may be synchronous, asynchronous, or both (FIG. 6 shows a synchronous change based on measured voltage, but asynchronous changes based on measured voltage may also be implemented). Further, supply voltage adjustments may not be instantaneous but, for example, may take a few microseconds to implement. In some embodiments, the device is configured to temporarily reduce frequency of one or more clock signals during the adjustment interval to increase timing margin. This may reduce or avoid negative effects of detected Vdroop.

After one more incremental decrease after the back-off, there is an asynchronous increase based on an updated operating state for one or more components (e.g., a ray tracing task causes activation of ray acceleration circuitry). This also corresponds to a change in the voltage ceiling in this example, after which the incremental decreases begin again. Note that the asynchronous change may happen within a P-state or correspond to a change in P-state. The change in the ceiling may occur based on an adjustment by aggregator circuitry 410, for example.

Example Method

Figure 7:
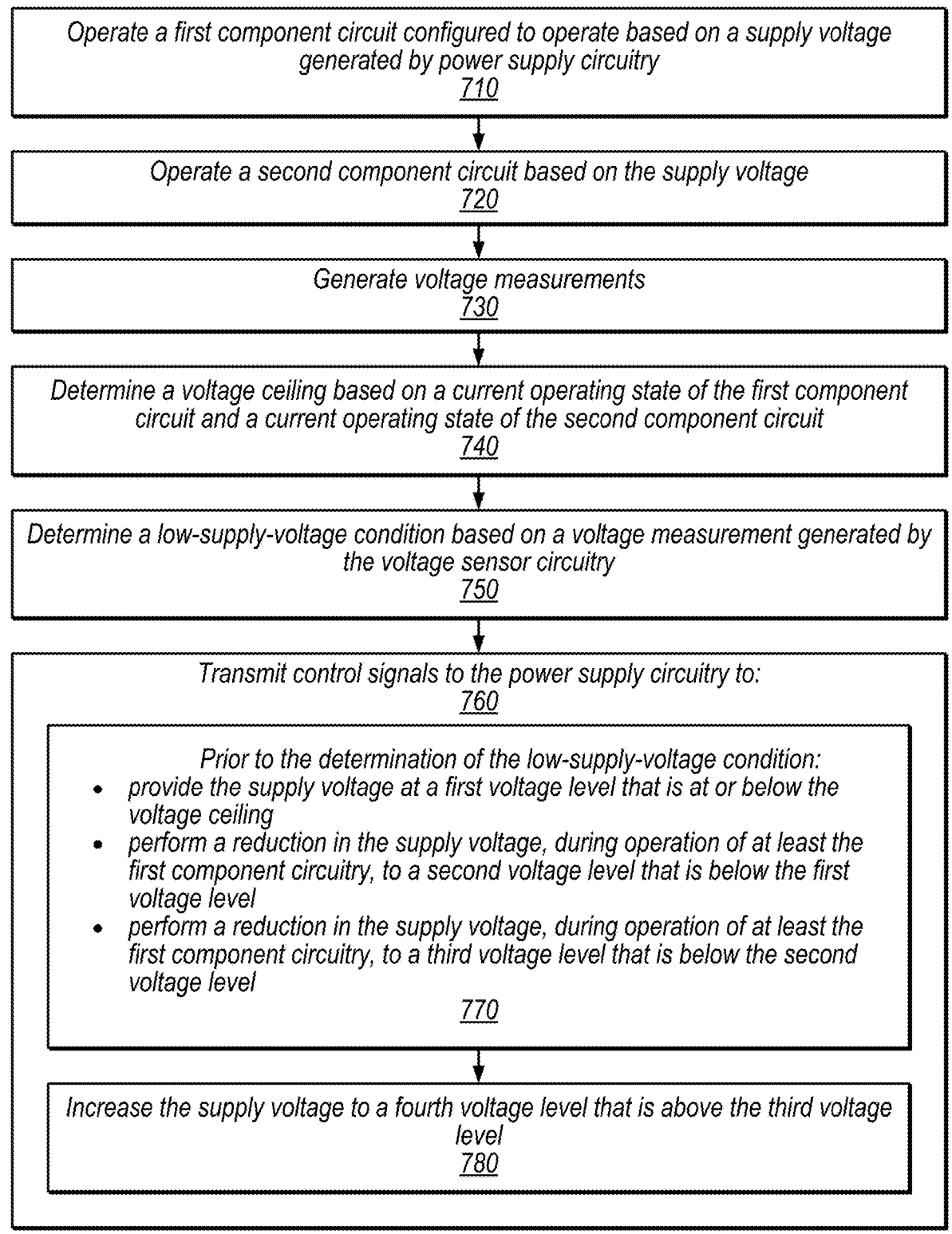
FIG. 7 is a flow diagram illustrating an example method for adaptive voltage control, according to some embodiments.

FIG. 7 is a flow diagram illustrating an example method for adaptive voltage control, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a system operates a first component circuit configured to operate based on a supply voltage generated by power supply circuitry.

At 720, in the illustrated embodiment, the system operates a second component circuit based on the supply voltage.

At 730, in the illustrated embodiment, the system (e.g., voltage sensor circuitry such as sensor 240) generates voltage measurements, e.g., at one or more junctions of circuitry of the system that is powered by the supply voltage (where the circuitry may or may not be included in the first and second component circuits).

At 740, in the illustrated embodiment, the system (e.g., voltage margin control circuitry such as circuitry 230) determines a voltage ceiling based on a current operating state of the first component circuit and a current operating state of the second component circuit. In some embodiments, the current operating state of the multiple component circuits includes both power gating information and activity information. In some embodiments, the voltage margin control circuitry is configured to adjust the voltage ceiling based on a change in the operating state of the multiple component circuits. In some embodiments, the multiple component circuits include ray tracing accelerator circuitry and matrix multiplier accelerator circuitry.

At 750, in the illustrated embodiment, the system (e.g., voltage margin control circuitry) determines a low-supply-voltage condition based on a voltage measurement generated by the voltage sensor circuitry. In some embodiments, the voltage sensor circuitry is configured to compare a voltage sensor output with a per-power-performance-state value to detect the low-supply-voltage condition. In some embodiments, filter circuitry filters the voltage sensor output prior to comparison with the per-power-performance-state value.

At 760, in the illustrated embodiment, the system transmits control signals to the power supply circuitry to perform the operations of elements 770 and 780.

At 770, in the illustrated embodiment, the system, prior to the to the determination of the low-supply-voltage condition, provides the supply voltage at a first voltage level that is at or below the voltage ceiling, performs a reduction in the supply voltage, during operation of at least the first component circuitry, to a second voltage level that is below the first voltage level, and performs a reduction in the supply voltage, during operation of at least the first component circuitry, to a third voltage level that is below the second voltage level.

At 780, in the illustrated embodiment, the system, increases the supply voltage to a fourth voltage level that is above the third voltage level in response to the determination of the low-supply-voltage condition. In some embodiments, an amount of the increase in the supply voltage to the fourth voltage level is programmable.

In some embodiments, the voltage margin control circuitry is configured to periodically determine whether to perform a reduction in the supply voltage or to increase the supply voltage based on a voltage measurement.

In some embodiments, the voltage margin control circuitry is configured to control the power supply circuitry to change the voltage level of the supply voltage in response to an asynchronous event, where the voltage margin control circuitry supports at least the following asynchronous events: a change in power performance state, an indication that a component circuit is busy or idle, and a low voltage warning corresponding to a lower measured voltage than the low-supply-voltage condition.

In some embodiments, the voltage margin control circuitry is configured to control an amount of the reduction to the second voltage level based on estimated voltage droop information. In some embodiments, a power control co-processor configured to execute a step control program to determine step sizes for the voltage margin control circuitry.

In some embodiments, in response to a component circuit being powered up: processor circuitry is configured to monitor for an instruction that targets the component. In response to an instruction that targets the component: the voltage margin control circuitry is configured to adjust the voltage ceiling and control the power supply circuitry to increase voltage margin for operation of the component, the processor circuitry is configured to operate the component at a partial rate until the supply voltage increases based on the adjustment to the voltage ceiling, and the processor circuitry is configured to begin operating the component at a full rate once the increase in voltage margin for operation of the component is complete.

Example Device

Figure 8:
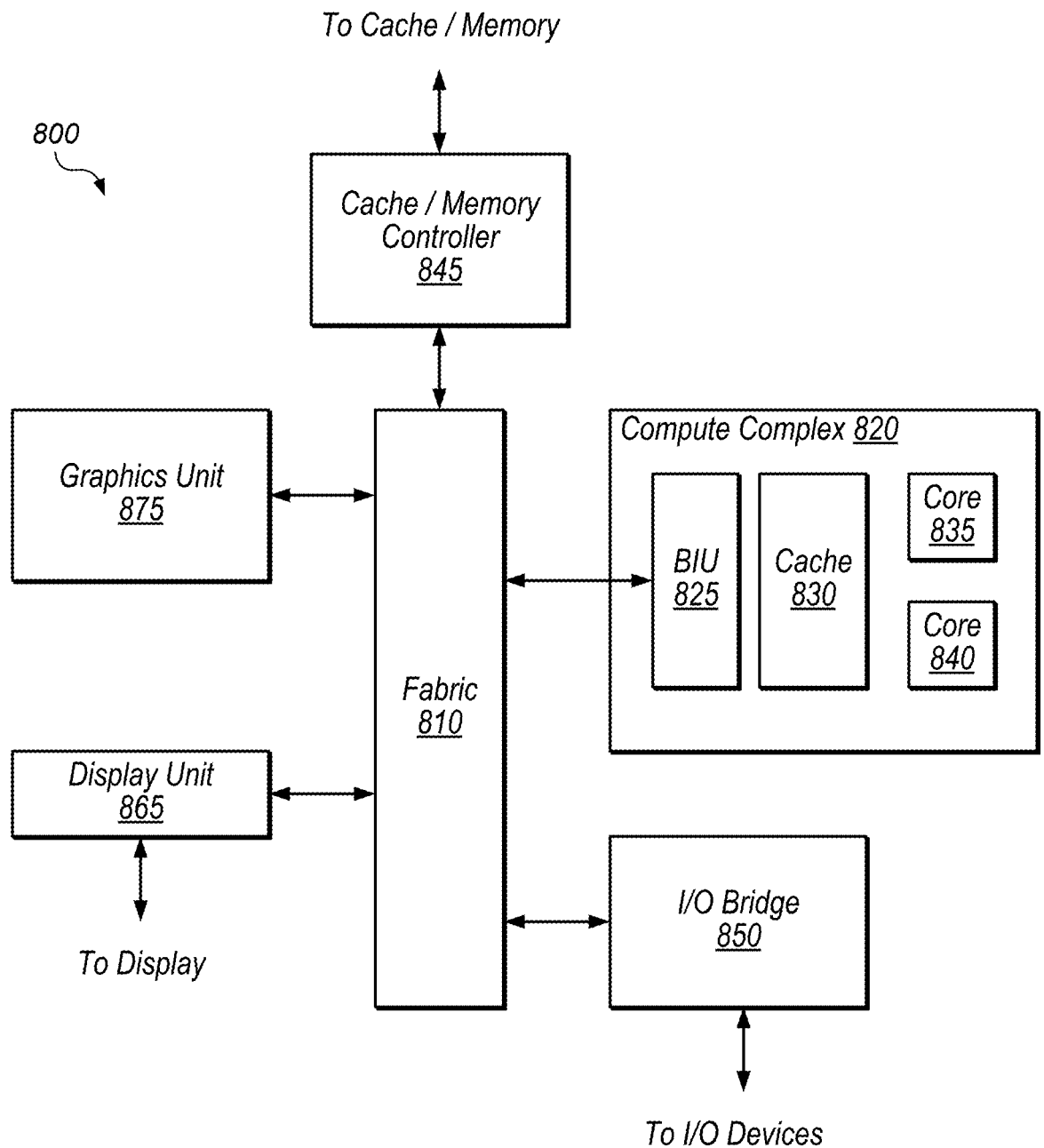
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

In some embodiments, disclosed adaptive voltage margin techniques may, for various elements of FIG. 8: advantageously improve performance, reduce power consumption, reduce errors, reduce equipment damage, or some combination thereof, relative to traditional techniques.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
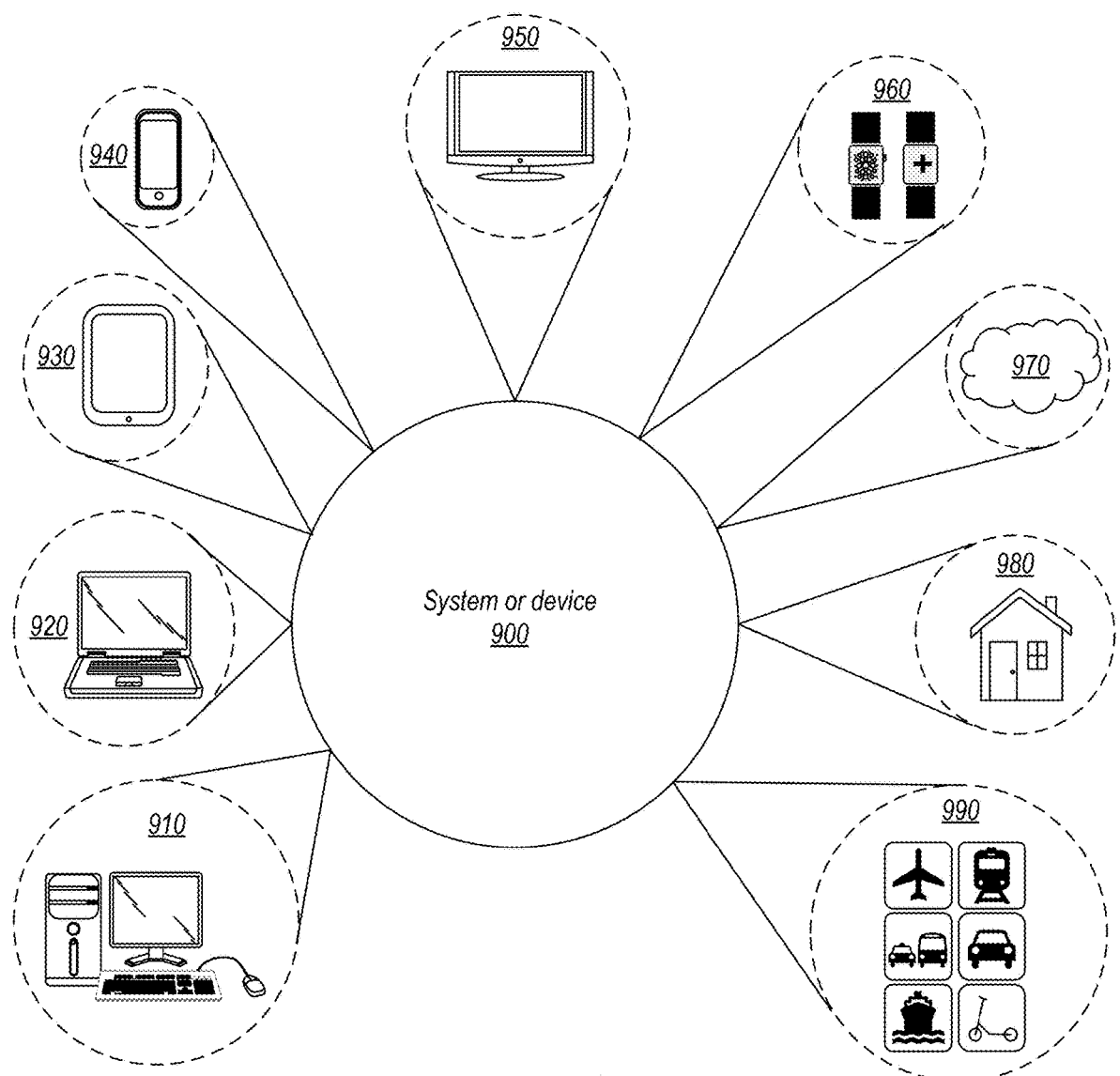
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
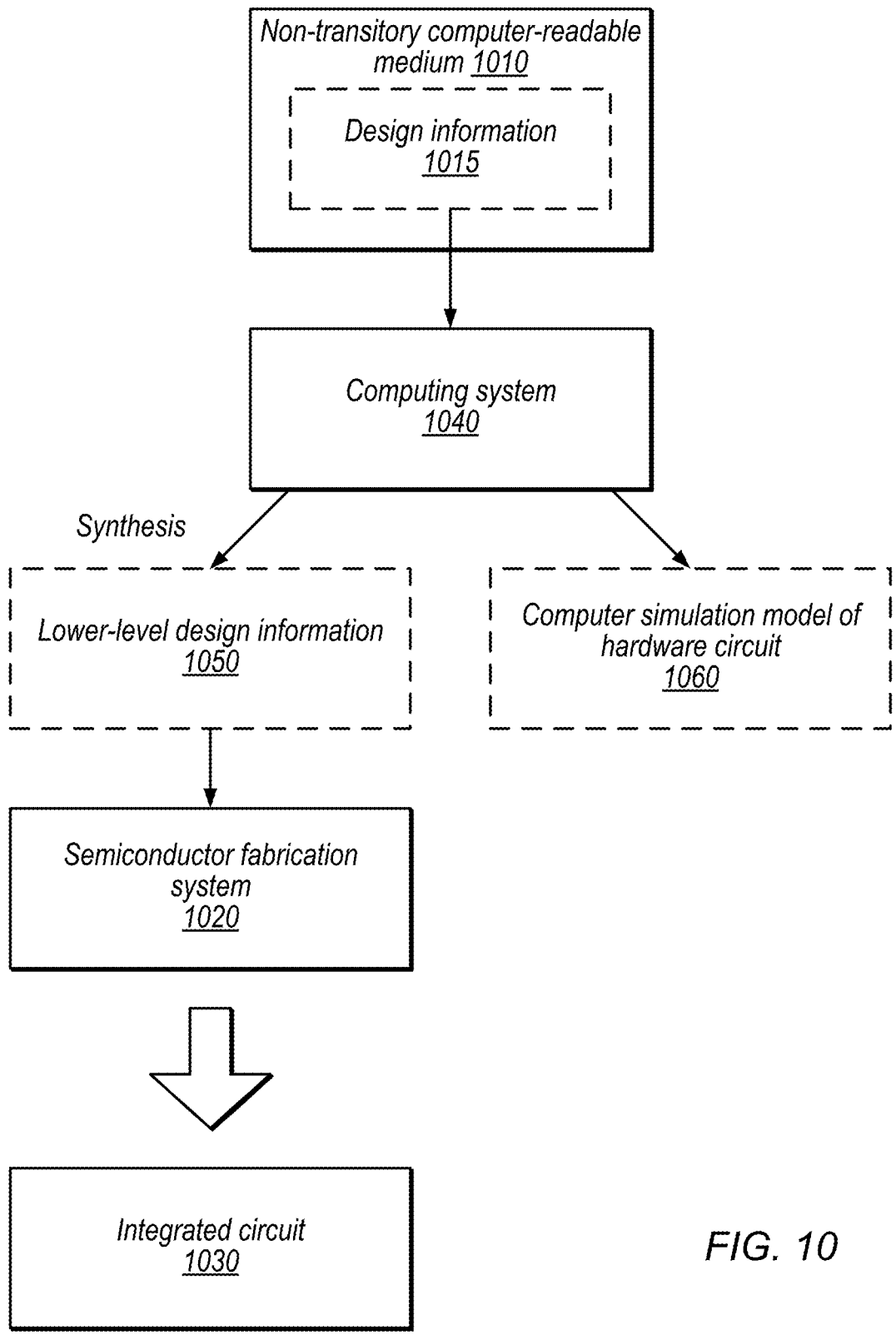
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1B, 2, 4, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
   a first component circuit configured to operate based on a supply voltage generated by power supply circuitry;
   a second component circuit configured to operate based on the supply voltage;
   voltage sensor circuitry configured to generate voltage measurements;
   voltage margin control circuitry configured to:
      determine a voltage ceiling based on a current operating state of the first component circuit and a current operating state of the second component circuit, including to:
         determine a first voltage ceiling based on a first scenario with clock gating of at least a portion of the first component circuit and a first performance state of the second component circuit; and
         determine a second voltage ceiling based on a second scenario with no clock gating of the first component circuit and a second performance state of the second component circuit;
      determine a low-supply-voltage condition based on a voltage measurement generated by the voltage sensor circuitry; and
      transmit control signals to the power supply circuitry to:
         prior to the determination of the low-supply-voltage condition:
            provide the supply voltage at a first voltage level that is at or below the first voltage ceiling;
            perform a reduction in the supply voltage, during operation of at least the first component circuit, to a second voltage level that is below the first voltage level; and
            perform a reduction in the supply voltage, during operation of at least the first component circuit, to a third voltage level that is below the second voltage level; and
         in response to the determination of the low-supply-voltage condition, increase the supply voltage to a fourth voltage level that is above the third voltage level.

2. The apparatus of claim 1, wherein the voltage margin control circuitry is configured to periodically determine whether to perform a reduction in the supply voltage or to increase the supply voltage based on a voltage measurement.

3. The apparatus of claim 1, wherein the voltage margin control circuitry is configured to control the power supply circuitry to change the voltage level of the supply voltage in response to an asynchronous event, wherein the voltage margin control circuitry supports at least the following asynchronous events:
   a change in power performance state;
   an indication that a component circuit is busy or idle; and
   a low voltage warning corresponding to a lower measured voltage than the low-supply-voltage condition.

4. The apparatus of claim 1, wherein the voltage margin control circuitry is configured to control an amount of the reduction to the second voltage level based on estimated voltage droop information.

5. The apparatus of claim 1, wherein the current operating state of multiple component circuits includes activity information.

6. The apparatus of claim 1, wherein the voltage margin control circuitry is configured to adjust a current voltage ceiling based on a change in the operating state of multiple component circuits.

7. The apparatus of claim 6, wherein the multiple component circuits include ray tracing accelerator circuitry and matrix multiplier accelerator circuitry.

8. The apparatus of claim 1, wherein in response to a component circuit being powered up:
   processor circuitry is configured to monitor for an instruction that targets the component;
   in response to an instruction that targets the component:
      the voltage margin control circuitry is configured to adjust a current voltage ceiling and control the power supply circuitry to increase voltage margin for operation of the component;
      the processor circuitry is configured to operate the component at a partial rate until the supply voltage increases based on the adjustment to the current voltage ceiling; and
      the processor circuitry is configured to begin operating the component at a full rate once the increase in voltage margin for operation of the component is complete.

9. The apparatus of claim 1, wherein an amount of the increase in the supply voltage to the fourth voltage level is programmable.

10. The apparatus of claim 1, wherein the voltage sensor circuitry is configured to compare a voltage sensor output with a per-power-performance-state value to detect the low-supply-voltage condition.

11. The apparatus of claim 10, further comprising filter circuitry configured to filter the voltage sensor output prior to comparison with the per-power-performance-state value.

12. The apparatus of claim 1, further comprising a power control co-processor configured to execute a step control program to determine step sizes for the voltage margin control circuitry.

13. The apparatus of claim 1, further comprising:
   the power supply circuitry.

14. The apparatus of claim 1, wherein the apparatus is a computing device that further comprises:
   a display;
   a central processing unit; and
   a network interface.

15. A method, comprising:
   operating, by a computing system, first component circuit based on a supply voltage generated by power supply circuitry;
   operating, by the computing system, second component circuit based on the supply voltage;
   generating, by the computing system using sensor circuitry, voltage measurements;
   determining, by the computing system, a voltage ceiling based on a current operating state of the first component circuit and a current operating state of the second component circuit, including:

determining a first voltage ceiling based on a first scenario with clock gating of at least a portion of the first component circuit and a first performance state of the second component circuit; and determining a second voltage ceiling based on a second scenario with no clock gating of the first component circuit and a second performance state of the second component circuit;

determining, by the computing system, a low-supply-voltage condition based on a voltage measurement generated by the sensor circuitry; and transmitting control signals to the power supply circuitry to:

prior to the determination of the low-supply-voltage condition:

provide the supply voltage at a first voltage level that is at or below the first voltage ceiling;

perform a reduction in the supply voltage, during operation of at least the first component circuit, to a second voltage level that is below the first voltage level; and perform a reduction in the supply voltage, during operation of at least the first component circuit, to a third voltage level that is below the second voltage level; and in response to the determining the low-supply-voltage condition, increase the supply voltage to a fourth voltage level that is above the third voltage level.

16. The method of claim 15, wherein the transmitting is based on periodically determining whether to perform a reduction in the supply voltage or to increase the supply voltage based on a voltage measurement.

17. The method of claim 16, further comprising:
controlling the power supply circuitry to change the voltage level of the supply voltage in response to an asynchronous event.

18. The method of claim 15, wherein the current operating state of multiple component circuits includes activity information.

19. The method of claim 15, further comprising:
executing a step control program to determine step sizes for the reductions.

20. A system, comprising:
power supply circuitry;
a first component circuit configured to operate based on a supply voltage generated by the power supply circuitry;
a second component circuit configured to operate based on the supply voltage;
voltage sensor circuitry configured to generate voltage measurements;
voltage margin control circuitry configured to:
determine a voltage ceiling based on a current operating state of the first component circuit and a current operating state of the second component circuit, including to:
determine a first voltage ceiling based on a first scenario with clock gating of at least a portion of the first component circuit and a first performance state of the second component circuit; and
determine a second voltage ceiling based on a second scenario with no clock gating of the first component circuit and a second performance state of the second component circuit;
determine a low-supply-voltage condition based on a voltage measurement generated by the voltage sensor circuitry; and
transmit control signals to the power supply circuitry to:
prior to the determination of the low-supply-voltage condition, incrementally reduce the supply voltage over multiple time periods; and
in response to the determination of the low-supply-voltage condition, increase the supply voltage.

* * * * *